United States Patent [19]

Moran

[11] 4,115,598
[45] Sep. 19, 1978

[54] PHASE INVERTING LOW FAT SPREADS

[75] Inventor: David Patrick Joseph Moran, Potters Bar, England

[73] Assignee: Lever Brothers Company, New York, N.Y.

[21] Appl. No.: 804,661

[22] Filed: Jun. 8, 1977

Related U.S. Application Data

[63] Continuation of Ser. No. 739,825, Nov. 8, 1976, abandoned.

[30] Foreign Application Priority Data

Nov. 7, 1975 [GB] United Kingdom ............... 46217/75

[51] Int. Cl.² .............................................. A23D 3/00
[52] U.S. Cl. .................................... 426/604; 426/607; 426/662
[58] Field of Search ................. 426/602, 603, 604, 607

[56] References Cited

U.S. PATENT DOCUMENTS

| Re. 28,903 | 7/1976 | Aneja et al. ...................... 426/604 X |
| 2,007,218 | 3/1933 | Seltzer ............................. 426/602 X |
| 3,360,377 | 12/1967 | Spitzer et al. ........................ 426/604 |
| 3,360,378 | 12/1967 | Spitzer et al. ........................ 426/604 |
| 3,457,086 | 7/1969 | Josefowicz et al. ................. 426/604 |
| 3,663,235 | 5/1972 | Menz et al. ........................... 426/604 |
| 3,939,282 | 2/1976 | Carlile et al. ........................ 426/603 |

Primary Examiner—Robert A. Yoncoskie
Attorney, Agent, or Firm—Michael J. Kelly; Melvin H. Kurtz; James J. Farrell

[57] ABSTRACT

The invention relates to emulsions of the low calorie type, i.e., water-in-oil type emulsions of a fat content of 35–65 percent.

The emulsions contain a fat blend having a solids content of 10–35 percent at all temperatures from 10°–20° C, a difference in solids content at 10° and 20° C of no more than 10 percent and a solids content at 30° C of less than 5 percent.

Monoglycerides, preferably of an iodine value of 20–100, are present and preferably oil-in-water emulsion promoting emulsifiers as well.

The emulsion destabilizes at body temperature; the degree of destabilization is expressed by the "Phase Instability Temperature."

13 Claims, No Drawings

PHASE INVERTING LOW FAT SPREADS

This is a continuation of application Ser. No. 739,825, filed Nov. 8, 1976 now abandoned.

DESCRIPTION OF THE INVENTION

The invention relates to water-in-oil type low fat spreads.

A problem that is often encountered in emulsions, particularly those of the so-called low calorie type, is that an insufficient flavor-release takes place by chewing the product in the mouth, because a substantial proportion of water droplets—which contain flavoring material—do not reach the papillae in the mouth but remain enveloped with the continuous fat phase.

An improvement in flavor release can in principle be achieved by taking care that the product has a coarser emulsion structure than conventional products, so as to obtain a more unstable emulsion, which upon mastication on the palate will give a better flavor release. From a microbiological point of view, however, such emulsions are dangerous, since upon storage water separation can easily take place, which may result in unacceptable bacteriological infections of the product.

The present invention provides an emulsion which comprises 35 to 65, preferably 50-65 percent by weight of a dispersed aqueous phase of a pH value of 4-6 and 65 to 35, preferably 50-35 percent by wt of a continuous fat phase containing a minor amount of a partial glyceride emulsifier, the fat having a solid content of 10-35 percent at all temperatures from 10°-20° C, a difference in solid content at 10° and 20° C of no more than 10 percent, and a solid content at 30° C of less than 5 percent, and preferably of no more than 0.5, especially no more than 0.1 percent at 35° C, the emulsion having a phase instability temperature of 10°-40° C, preferably at least 15° C, particularly from 20°-35° C.

In this specification by "phase instability temperature" (PIT) is understood the temperature at which the emulsion, under shear conditions similar to those that occur on the palate and as measured by the "PIT-test," which will hereinafter be described, shows a marked increased tendency to conduct electricity.

The terms "dispersed phase" and "continuous phase" refer to the condition of the emulsion at room temperature, i.e., about 20° C.

In this specification all percentages are by weight and are calculated on the total weight of the low fat spread (except the solid contents) unless otherwise indicated. The solids contents are expressed as percentages by weight and are calculated on the weight of the fat blend. The solids contents were measured by the method of Haighton, Vermaas and Den Hollander as described in J.A.O.C.S. Vol. 48, pages 7-10.

An advantage of the low fat spread of the invention is that a substantial proportion of the dispersed aqueous phase is released in the mouth, whereby water-soluble emulsifiers are freed into the saliva, which causes the former fat-continuous phase to emulsify into the saliva, thereby giving an oil-in-water emulsion in the mouth. In the low fat spread of the invention up to 90percent or even more of the dispersed aqueous phase can break out under palate conditions within about 10 seconds. This will result in a rapid flavor release, not only because the water-soluble flavors are released, but also because of a rapid partition of essentially oil-soluble flavor components into the saliva, which become part of the continuous aqueous phase under palate conditions, due to the high interfacial area of the oil-in-water emulsion which is formed.

The dilatometric characteristics of the fat blend of the emulsion of the invention will substantially avoid the formation of high-melting trisaturated triglycerides through recrystallization on cycling of the temperature of the emulsion during storage, which glycerides at relatively low levels would have under palate conditions W/O emulsion stabilizing properties.

The dilatometric characteristics of the fat blend also influence the product instability, especially under conditions of shear as met with on the palate. Preferably a fat blend is used having a solid content at 10°-20° C which is as invariable as possible, e.g., a difference in solid content between 10° and 20° C of no more than 5 percent. Products containing a fat blend of such a solids/temperature curve will have a minimum of melting and re-crystallisation of glycerides on cycling of the temperature within the range of e.g., 10°-20° C, an improved feel of coolness on the palate during melting of the glycerides, and a low solids content at 30° C, which will help to avoid a greasy feel on the palate of the molten product.

The type and proportion of both the emulsifier system and the fat blend are of importance for ensuring a sufficient degree of product instability at palate conditions. Suitable amounts of partial glycerides are from about 0.1 to 0.8 percent by weight. Preferably partial glycerides are used that are not completely saturated, e.g., partial glycerides of fatty acids with 16-22 carbon atoms and having an iodine value of 20-100, especially 30-60.

Monoglycerides of an iodine value of 30-60, especially 35-50, e.g., those of unhydrogenated lard or tallow are particularly preferred. The partial glycerides can be present in proportions within the range indicated above; preferably however the content of partial glycerides is adjusted to the fat content of the low fat spread of the invention.

Suitable weight ratios of fat:partial glycerides are e.g., from (50:1) to (500:1), preferably from (100:1) to (300:1).

Preferably the emulsion further comprises oil-in-water promoting emulsifiers, e.g., phosphatides, especially partly hydrolyzed phosphatides, and synthetic emulsifiers e.g. fatty acid sugar esters, Tweens, etc., e.g., in a proportion of 0.01, preferably 0.02 to 0.6 percent by weight. If phosphatides are used in the low fat spreads of the present invention, they preferably contain some 5-25 percent of mono-acyl glycero phosphatides, particularly α-mono acyl glycero phosphatides, calculated on the total weight of phosphatides. Such phosphatides can be prepared by synthesis or by chemical hydrolysis (of British patent application No. 18,163/68) or by enzymatic hydrolysis of diacyl-glycerophosphatides under conditions known per se (of British patent specification No. 1,215,868).

Proteins can similarly be used as oil-in-water promoting emulsifiers.

Although no more than 0.01-0.6 percent by weight thereof is sufficient for effecting phase inversion of the low fat spread under palate conditions, proportions up to 12 percent, preferably up to 8 percent can be used, since the excess proteins do not destabilize the emulsion under normal processing and storage conditions, provided that a suitable proportion of partial glycerides is present. Such oil-in-water promoting emulsifiers therefore assist in counterbalancing the water-in-oil promoting properties of the partial glycerides under palate conditions, without effecting destabilization of the emulsion at normal storage, use and transport conditions.

Whole vegetable phosphatides, i.e., non-chemically treated or fractionated phosphatides derived, e.g., from soyabean, rapeseed or corn preferably need a more solid fat blend than emulsifiers of higher HLB values such as lysolecithin containing partially hydrolyzed phosphatides, proteins, etc. Such lower HLB emulsifiers probably need the grinding action of more solid fat crystals in the initial stage of mastication in order to promote the destabilization of the low fat spread on the palate.

Suitably whole vegetable phosphatides are used in low fat spreads containing a fat blend having a solids content of 26–35% at 10° C and preferably 18–25 percent at 20° C.

Emulsifiers which like whole phosphatides are less efficient oil-in-water emulsifiers, i.e., those of HLB values of about 10–16, are preferably also used together with a fat blend of high solids content at 10° and 20° C.

Particularly proteinaceous water-soluble emulsifiers are preferred, since they are very potent counter-emulsifiers and furthermore they will protect the fat blend against oxidation. Finally such emulsifiers can contain natural flavors, e.g., those obtained through culturing.

When a fat blend of suitable solids content is used, the desired phase instability temperature can be obtained by properly balancing the following factors:
1. The nature and proportion of fat-soluble partial glyceride emulsifiers.
2. The nature and proportion of water-soluble emulsifiers.

Preferably the emulsion further comprises hydrocolloids in the aqueous phase for raising the interfacial stability and also enhancing the emulsion-stabilising properties of the fat crystals under use and storage conditions. The concentration of hydrocolloids should be chosen in such a way that a proper balance in viscosity of the continuous fat phase and the dispersed aqueous phase is obtained. A suitable hydrocolloid content can vary from about 0.1 to 1.5 percent by weight.

Further advantages of using hydrocolloids, particularly locust bean gum, and its hardness-decreasing influence on the plastic emulsions of the invention and it also helps to control the palate sensation of the released aqueous phase in terms of viscosity.

It has surprisingly been observed that locust bean gum and milk proteins have a synergistic effect on the increase of viscosity.

PIT-Test

A Haake Rotovisko is equipped with the MV measuring system. The Haake MVII bob is used at speed 1, under which conditions the shear rate being applied to the sample is 441 sec$^{-1}$, which is a high but representative figure for the conditions on the palate.

Electrodes, made from aluminium foil, are inserted between the MVII bob and the Haake measuring cup wall. (The electrodes are 1 cm. wide and 15 cm. long). Those parts of the electrodes which can come into contact with the cup wall were insolated with a layer of glue of the trade name "Araldite."

The electrodes are connected to a conductivity bridge, for measuring the conductivity of the emulsion under test.

Measurements of conductivity and viscosity are made at 5° C intervals starting, e.g., from 20° or lower to the PIT, which is the temperature at which conductance increases markedly, i.e., with at least 10$^4$Mhos, or to 70° C if no inversion (thus no marked increase in conductivity) can be detected. The emulsion is maintained at each temperature for 15 minutes, to ensure that equilibrium has been reached, and the Rotovisko bob is kept rotating at speed 1 throughout the experiment.

The invention will now be illustrated by the following examples in which all proportions and percentages are by weight and are calculated on the weight of the low fat spread, unless otherwise indicated.

EXAMPLE I

A fat phase consisting of palm oil mid-fraction (30 parts) and sunflower oil (70 parts) was prepared, refined and deodorised. The solid content of this blend was: at 10° C 24%, at 20° C 17%, at 30° C 2% and at 35° C 0%. The palm mid-fraction was obtained by acetone fractionation of palm oil as follows:

(a) 300 g. of refined deodorised palm oil of I.V. 53.4 were mixed with 1½ liters of acetone and the mixture warmed until a clear solution was obtained (30° C). The solution was then cooled to 6.5° C over ½ hour whilst being gently stirred with a glass rod. It was allowed to stand for ½ hour at 6.5° C and then filtered through a cooled Buchner funnel with vacuum. The cake was pressed with a glass plunger, and then washed twice on the filter with 250 ml. acetone at 5° C, for each wash, the cake being pressed between each wash. It was then removed from the filter and the residual acetone distilled off under vacuum. The yield was 93.9 g. of a fraction having an I.V. of 28.9.

(b) To 80 g. of the product of stage (a) were added 80 ml. of acetone and the mixture warmed to 45° C. To this were added 400 ml. of acetone at 19° C with stirring and the final temperature of the mixture adjusted to 26° C. It was allowed to stand at this temperature for 20 minutes and then filtered through a Buchner funnel, pressed and washed on the filter with 250 ml. acetone at 26° C. The filtrate and wash liquor were combined and the acetone removed by distillation under vacuum. The yield was 67.5 g. Its characteristics are given in the following table:

| Component/characteristics | Palm Mid-Fraction |
|---|---|
| Iodine value | 34.4 |
| Melting point (° C) | 33.4 |
| Refractionation index N$^{65}$D 1.4 | 468 |
| f.f.a (%) | 0.1 |
| Monoglycerides (%) | traces |
| Diglycerides (%) | 1.5 |
| Triglycerides* (%) | 98.5 |
| S$_3$ (% of triglycerides) | 3.1 |
| S$_2$U (% of triglycerides) | 83.6 |
| SU$_2$ (% of triglycerides) | 9.8 |
| U$_3$ (% of triglycerides) | 3.5 |
| Fatty acid composition** | |
| C 14 : 0 | 0.4 |
| C 16 : 0 | 57.1 |
| C 16 : 1 | |
| C 17 : 0 | |
| C 18 : 0 | 7.5 |
| C 18 : 1 | 32.0 |
| C 18 : 2 | 3.0 |
| C 20 : 0 | traces |
| C 20 : 1 | |

*S × saturated; U × unsaturated
**e.g. C 18 : 1 × mono-unsaturated C$_{18}$ fatty acid.

39.8 percent of the blend of palm oil mid fraction and sunflower oil was melted under nitrogen, at 40° C, and into this 0.2 percent of commercial monoglyceride of unhydrogenated lard of an iodine value of 44 was dissolved.

To the above mixture oil-soluble flavors and color were also added.

The water phase of the product was prepared by dissolving 1.75 percent sodium chloride in 58.25 percent water.

0.05 percent of a water-soluble lecithin fraction, obtained through partial hydrolysis with phospholipase A of soyabean phosphatides as described in British patent specification No. 1,215,868, was then dispersed in the water phase. (The content of α-monoacy glycero phosphatides was about 12 percent of the total phosphatide content.)

A viscosity raising agent was added to the water phase, i.e., 0.75 percent locust bean gum.

The pH of the water phase was adjusted to a value of 4.5 to 5.5 by citric acid.

An emulsion of the aqueous phase in the fat phase was prepared by slowly adding the water phase to the fat phase, with gentle stirring, at 35° C.

The emulsion formed was then processed through a conventional Votator, consisting of two A-units (scraped surface coolers) in which the product was worked and cooled to 15°-20° C, and one P.C.U. (post-crystallizing unit).

The PIT was about 28° C.

EXAMPLE II

A fat phase consisting of 32.15 percent soyabean oil (hardened to m.pt. 35° C), 21.53 percent partially hardened rapeseed oil, 9.32% soyabean oil (hardened to m.pt. 42° C) and 37.0 percent sunflower oil, was refined and deodorized (percent calculated on the weight of the fat blend).

The solid content of this blend was: at 10° C 32 percent, at 20° C 24 percent, at 30° C 2.5 percent and at 35° C 0 percent.

39.7 percent Of the above blend was melted under nitrogen at 40° C, and into this 0.3 percent of commercial monoglycerides of unhydrogenated lard of an iodine value of 44 was dissolved.

To the above mixture oil-soluble flavors were added.

The water phase of the product was prepared by dissolving 0.5 percent buttermilk powder in 53.8 percent water.

The buttermilk solution was heated to 95° C and into this 1.75 percent salt, 0.1 percent sodium tripolyphosphate, 0.1 percent potassium sorbate and 0.75 percent locust bean gum were dissolved.

The solution was cooled to 45° C and 3 percent cultured buttermilk was added.

The pH of the mixture was adjusted to 4.5 to 5.0 with tartaric acid.

An emulsion of the aqueous phase in the fat phase was prepared by slowly adding the aqueous phase to the oil with gentle stirring.

The emulsion was then processed through a conventional Votator system consisting of an A-unit (scraped surface cooler) and a P.C.U. (post-crystallising unit).

The product was packed into tubs at 15° C.

The PIT was about 20° C.

EXAMPLE III

A fat phase consisting of palm oil mid-fraction (25 percent) with sunflower oil (75 percent) was prepared, refined and deodorised. The palm oil mid-fraction was prepared as described in Example I. The solid content of the fat blend was at 10° C 19 percent, at 20° C 12 percent, at 30° C 1 percent, at 35° C 0 percent.

39.7 percent Of the palm mid/sunflower oil blend was melted at 40° C, and into this 0.2 percent of commercial monoglyceride of unhydrogenated lard with an iodine value of 44 and 0.1 percent whole soyabean phosphatides were dissolved.

The water phase of the product was then prepared by dissolving 1.75 percent sodium chloride in 58.25 percent water. (Percentages given as the percent of component in the final composition.)

The pH of the water phase was adjusted to a pH of 4.5 to 5.5, using citric acid.

An emulsion of the aqueous phase in the fat phase was prepared by slowly adding the water phase to the fat phase with gentle stirring at 35° C.

The emulsion was then processed through a conventional Votator, consisting of two A-units (scraped surface coolers) and one P.C.U. (post-crystallizer working unit).

The product was packed at 10°-15° C into tubs.

The amount of aqueous phase released under simulated palate conditions (440 secs$^{-1}$, 37° C, 10 secs.) was 70 percent.

The PIT was about 26° C.

EXAMPLE IV

The fat phase of Example III was used.

38 percent of the blend of palm oil mid fraction and sunflower oil was melted under nitrogen at 45° C and into this 0.5 percent of commercial monoglyceride of unhydrogenated lard of an iodine value of 44 was dissolved.

56.75 percent Of water was heated to 95° C and into this 1.0 percent of salt and 0.75 percent of locust bean gum was dissolved using vigorous stirring to ensure complete solution of the gelling agent.

The mixture obtained was cooled to 45° C, and 3 percent cultured buttermilk was added to the mix.

The pH of the mix was adjusted to 4.5-5.0 with tartaric acid, an acid which allows a considerable drop in pH value without imparting too acid a taste to the product.

An emulsion of the aqueous phase in the fat phase was prepared by slowly adding the aqueous phase to the fat phase with gentle stirring at 45° C.

The emulsion was then processed through a conventional Votator consisting of an A-unit (scraped surface cooler) and a P.C.U. (post-crystallizer working unit).

The product was packed at 10°-15° C into tubs.

The amount of aqueous phase released under simulated palate conditions (440 sec$^{-1}$, 37° C, 10 secs.) was 90 percent.

The PIT was: about 20° C.

EXAMPLE V

A low fat spread was prepared as described in Example I using 59 percent of the same fat blend as was used in Example I and furthermore:

| | |
|---|---|
| monoglycerides from unhydrogenated lard (I.V. 44) | 0.2% |
| water | 32.4% |
| sodium caseinate | 6.2% |
| salt | 1.5% |
| potassium sorbate | 0.1% |
| sodium tripolyphosphate | 0.1% |
| locust bean gum | 0.5% |

The pH was adjusted to 5.8 with citric acid.
The PIT was 20° C.

EXAMPLE VI

Example I was repeated, except that the fat blend of Example II was used, that the partially hydrolyzed phosphatides were replaced by whole soyabean phosphatides (0.05 percent) and that the monoglyceride content was raised to 0.3 percent.

The proportion of water was correspondingly adjusted.

The PIT was just over 30° C.

I claim:

1. A water-in-oil emulsion which destabilizes at body temperature comprising:
   (a) 50 to 65 percent by weight of a dispersed aqueous phase, wherein said phase has a pH value of 4 to 6;
   (b) 50 to 35 percent by weight of a continuous fat phase, wherein said fat has:
      (i) a solids content of 10 to 35 percent at all temperatures from 10° to 20° C;
      (ii) a difference in solids content at 10° and 20° C of no greater than 10 percent, and
      (iii) a solids content at 30° C of less than 5 percent but at least 10 percent less than the solids content at 20° C; and
   (c) an emulsifier system comprising:
      (i) 0.1 to 0.8 percent by weight of said emulsion of a partial glyceride emulsifier, wherein said partial glyceride emulsifier has an iodine value of 20 to 100, and
      (ii) an amount sufficient of an oil-in-water promoting emulsifier to give the emulsion a phase instability temperature of 20° to 35° C.

2. An emulsion according to claim 1, wherein said solids content of said fat at 35° C is no more than 0.5 percent.

3. An emulsion according to claim 2, wherein said solids content of said fat at 35° C is no more than 0.1 percent.

4. An emulsion according to claim 1, wherein said difference in solids content between 10° and 20° C is no more than 5 percent.

5. An emulsion according to claim 1, wherein said iodine value of said partial glyceride emulsifier is 30 to 60.

6. An emulsion according to claim 1, wherein the weight ratio of said fat to said partial glyceride emulsifier is (50:1) to (500:1).

7. An emulsion according to claim 1, where the amount of said oil-in-water promoting emulsifiers is 0.02 to 0.6 percent by weight of said emulsion.

8. An emulsion according to claim 1, wherein said oil-in-water promoting emulsifiers are phosphatides.

9. An emulsion according to claim 8, wherein said phosphatides contain 5–25 percent of mono-acylglycero phosphatides by weight.

10. An emulsion according to claim 9, wherein said phosphatides are whole vegetable phosphatides; and wherein said fat has a solids content of 26 to 35 percent at 10° C.

11. An emulsion according to claim 1, wherein said oil-in-water promoting emulsifiers are proteins.

12. An emulsion according to claim 11, containing up to 12 percent of said proteins.

13. An emulsion according to claim 1, further comprising hydrocolloids in said aqueous phase in amounts of 0.1 to 1.5 percent by weight of said emulsion.

* * * * *